United States Patent [19]

Miyatake et al.

[11] Patent Number: 4,956,869

[45] Date of Patent: Sep. 11, 1990

[54] METHOD OF TRACING CONTOUR AND A SYSTEM THEREFOR

[75] Inventors: Takafumi Miyatake, Hachiouji; Hitoshi Matsushima, Tachikawa, both of Japan

[73] Assignee: Hitachi, Ltd.

[21] Appl. No.: 154,378

[22] Filed: Feb. 10, 1988

[51] Int. Cl.⁵ .............................................. G06K 9/48
[52] U.S. Cl. ...................................... 382/22; 382/21; 382/26; 382/60
[58] Field of Search .................... 382/21, 22, 26, 60; 358/101, 106

[56] References Cited

U.S. PATENT DOCUMENTS 3,713,098  1/1973  Muenchhausen et al. ............ 382/22
3,968,475  7/1976  McMahon .............................. 382/21

OTHER PUBLICATIONS

Komatsu et al, Apparatus for Encoding Image Data, European Patent Application No. 0164 825, Dec. 18, 1985.
James A Tidd, Photocomposition System Employing Electronic Character Generation from Magnetically Stored Data, Great Britian Application No. 2038598, Jul. 23, 1980.

Primary Examiner—David K. Moore
Assistant Examiner—Michael Razavi
Attorney, Agent, or Firm—Antonelli, Terry, Stout & Kraus

[57] ABSTRACT

A system for tracing contour to prepare contour coordinates by tracing contour lines of a figure from an image that consists of a set of a plurality of lines, comprising a memory stored in advance from a basic pattern related to figure contour lines of positions of image transistion points between the neighboring two lines. An image transition point of a line is detected and another image transition point of a line that precedes the above line is detected, too. A pattern of image transistion points of the above two lines is extracted based upon the basic pattern. The thus extracted basic patterns are then integrated and are converted into contour coordinates.

8 Claims, 6 Drawing Sheets

FIG. 5
(a) OUTLINE OF THE AUTOMATON
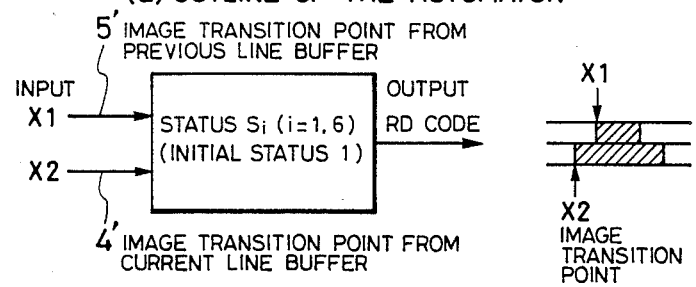
(b) DETAILS OF THE AUTOMATON
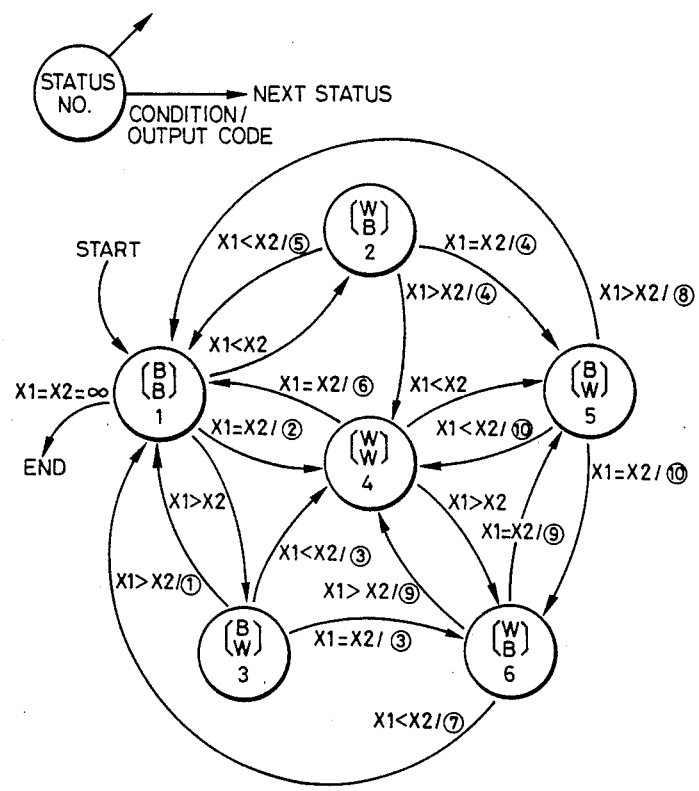

FIG. 6

| CURRENT STATUS | CONDITION X1 : X2 | X RENEWAL | RD CODE EXTRACTION & ENTRY | NEXT CONTROL | |
|---|---|---|---|---|---|
| | | | | NEXT STATUS | LINE BUFFER WHICH IS READ THE NEXT IMAGE TRANSITION POINT |
| 1 | < | — | — | 2 | PREVIOUS LINE |
| | = | — | ② | 4 | BOTH LINES |
| | > | X ← X2 | — | 3 | CURRENT LINE |
| 2 | < | X ← X1 | ⑤ | 1 | PREVIOUS LINE |
| | = | X ← X1 | ④ | 5 | BOTH LINES |
| | > | X ← X2 | ④ | 4 | CURRENT LINE |
| 3 | < | — | ③ | 4 | PREVIOUS LINE |
| | = | — | ③ | 6 | BOTH LINES |
| | > | — | ① | 1 | CURRENT LINE |
| 4 | < | X ← X1 | — | 5 | PREVIOUS LINE |
| | = | — | ⑥ | 1 | BOTH LINES |
| | > | — | — | 6 | CURRENT LINE |
| 5 | < | — | ⑩ | 4 | PREVIOUS LINE |
| | = | — | ⑩ | 6 | BOTH LINES |
| | > | — | ⑧ | 1 | CURRENT LINE |
| 6 | < | X ← X1 | ⑦ | 1 | PREVIOUS LINE |
| | = | X ← X1 | ⑨ | 5 | BOTH LINES |
| | > | X ← X2 | ⑨ | 4 | CURRENT LINE |

INITIAL STATUS : 1
TERMINAL STATUS : 1

X : X COORDINATE WHEN ON RD CODE ENTERED
X1: X COORDINATE OF THE IMAGE TRANSITION POINT WHICH IS READ FROM PREVIOUS LINE BUFFER
X2: X COORDINATE OF THE IMAGE TRANSITION POINT WHICH IS READ FROM CURRENT LINE BUFFER

FIG. 7

RD-LIST

|   | X | Y | CODE | LINK | W-LINK |
|---|---|---|---|---|---|
| 1 | 2.5 | 1.5 | ① | 3 | 2 |
| 2 | 5.5 | 1.5 | ① | 4 | 3 |
| 3 | 1.5 | 2.5 | ③ | 6 | 5 |
| 4 | 3.5 | 2.5 | ⑩ | 1 | 0 |
| 5 | 6.5 | 2.5 | ⑧ | 2 | 6 |
| 6 | — | — | ② | 9 | 7 |
| 7 | 5.5 | 3.5 | ⑨ | 11 | 8 |
| 8 | — | — | ⑥ | 5 | 9 |
| 9 | 2.5 | 4.5 | ④ | 13 | 10 |
| 10 | — | — | ⑥ | 7 | 11 |
| 11 | — | — | ② | 14 | 12 |
| 12 | 7.5 | 4.5 | ⑦ | 8 | 0 |
| 13 | 3.5 | 5.5 | ⑤ | 10 | 0 |
| A→14 | 6.5 | 5.5 | ⑤ | 12 | 0 |

(B=0)
←C

RD-LIST(1,i)···　　　　　　　　RD-LIST(5,i)

A: THE POINTER WHICH INDICATES THE RD CODE ENTRY ADDRESS

B: THE POINTER WHICH INDICATES THE TOP ADDRESS OF WAITING LIST FOR RD CODE LINKING

C: THE POINTER WHICH INDICATES THE LAST ADDRESS OF WAITING LIST FOR RD CODE LINKING

METHOD OF TRACING CONTOUR AND A SYSTEM THEREFOR

BACKGROUND OF THE INVENTION:

1. Field of the Invention:

The present invention relates to a method of tracing the contour of a sampled figure, and particularly to a method of this type which is obtaining at high speeds the contour coordinates of a figure from the compression-encoded image of a figure or document.

2. Description of the Prior Art:

A conventional method of extracting contour coordinates of a figure in an image or of a material body consists of, first, finding the coordinates of image transition points when a scanning is effected from two directions that meet at right angles with respect to each other relative to the image, and then examining the continuity of these coordinate values, in order to obtain contour coordinates as disclosed in Japanese Patent Laid-Open No 111786/1982.

According to the above prior art, the image transition points must be extracted in both the horizontal and vertical directions, which results in a great processing quantity to cover the whole surface of the image. After the coordinates of image transition points are extracted, furthermore, a tracing is effected using a mask on a coordinate table which also requires an extended processing time.

SUMMARY OF THE INVENTION:

The object of the present invention is to provide a method of tracing a contour at high speeds without involving the above-mentioned problems For this purpose, the present invention deals with a contour tracing system which prepares contour coordinates by tracing contour lines of a figure from a sampled image that consists of a set of a plurality of lines, wherein:

an image transition point is detected for each line;

part of a figure determined by a relationship of the position of an image transition point of a first line and the position of an image transition point of a second line that precede the first line, is extracted based upon a basic pattern that constitutes a part of a plurality of predetermined figure contour lines; and the thus extracted basic patterns are integrated and are converted into contour coordinates.

BRIEF DESCRIPTION OF THE DRAWINGS:

FIG. 5a, b shows an automaton of a basic pattern extracting portion of FIG. 1;

FIG. 6 is a table of image transition point analysis illustrating the automaton of FIG. 5 depending upon the statuses;

FIG. 7 illustrates the data structure of the basic pattern link table of FIG. 1.

DETAILED DESCRIPTION OF THE PREFERRED EMBODIMENTS:

First, an outline of the operation of the invention will be described by way of certain embodiments.

To extract a basic pattern which constitutes a portion of a contour line, reference is made to an image transition point of a current line that is stored and an image transition point (X coordinate) of a previous line. A particular basic pattern is extracted from a relationship of positions at this moment, and is coupled by a pointer to the basic pattern extracted in the processing of the previous line. As the basic pattern is extracted for one line, the image transition point of the current line is transferred to a previous line memory unit and an image transition point of a new line is input to a current line memory unit. The above-mentioned processing is effected for all of the lines, and then the basic patterns coupled by the pointers are integrated to obtain contour coordinates.

The above-mentioned system makes it possible to trace the contour using image transition points in one direction only. Furthermore, pointers are imparted to the basic patterns so that they can be converted into contour coordinates at high speeds.

In the processing for transferring the contents of the current line memory unit to the previous line memory unit, addresses of each of the line memory means are alternatingly switched so that the data need not really be transferred.

Figure 1:
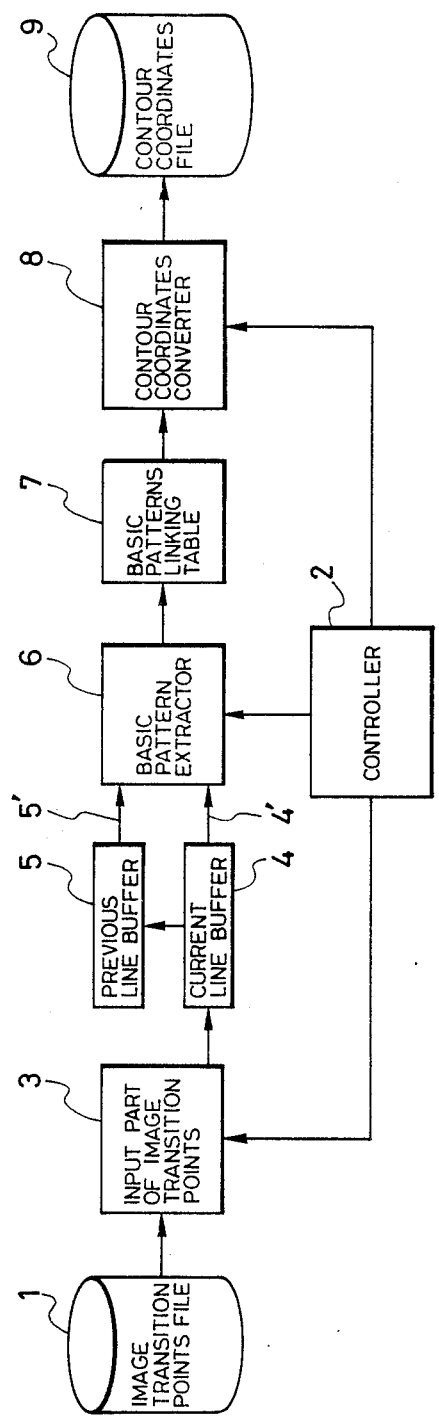
FIG. 1 is a diagram illustrating the overall system according to an embodiment of the present invention.

The invention will now be described in conjunction with the drawings. FIG. 1 is a diagram illustrating a system for tracing a contour according to the present invention. In FIG. 1, reference numeral 1 denotes an image transition point file, 2 denotes a controller, 3 denotes an input part of image transition points, 4 denotes a current line buffer, 5 denotes a previous line buffer, 6 denotes a basic pattern extractor, 7 denotes a basic pattern linking table, 8 denotes a contour coordinate converter and reference numeral 9 denotes a contour coordinate file. The image transition point file 1 stores coordinates of image transition points of each of the lines that will be input to the current line buffer through the input part of image transition points 3 for each of the lines. At this moment, the image transition points that have been stored in the current line buffer 4 are transferred to the previous line buffer 5. Next, the basic pattern extractor 6 reads the contents of the line buffers 4 and 5 one by one, and extracts the basic pattern that constitutes a portion of the contour line based upon the magnitude of the coordinates. The extracted basic pattern is stored in the basic pattern linking table 7. Here, the basic pattern is linked by a pointer to the basic pattern extracted in the previous line. After the basic patterns are all extracted for the contents of the line buffers 4 and 5, an image transition point of the next line is read out from the image transition point file 1. After the above-mentioned process is effected for all of the lines, the contour coordinate converter 8 integrates the basic patterns of the basic pattern linking table 7 while tracing the pointers and preparing contour coordinates and sends them to the contour coordinate file 9, whereby the tracing of the contour is finished. The controller 2 controls all of the above-mentioned processings.

Figure 2:
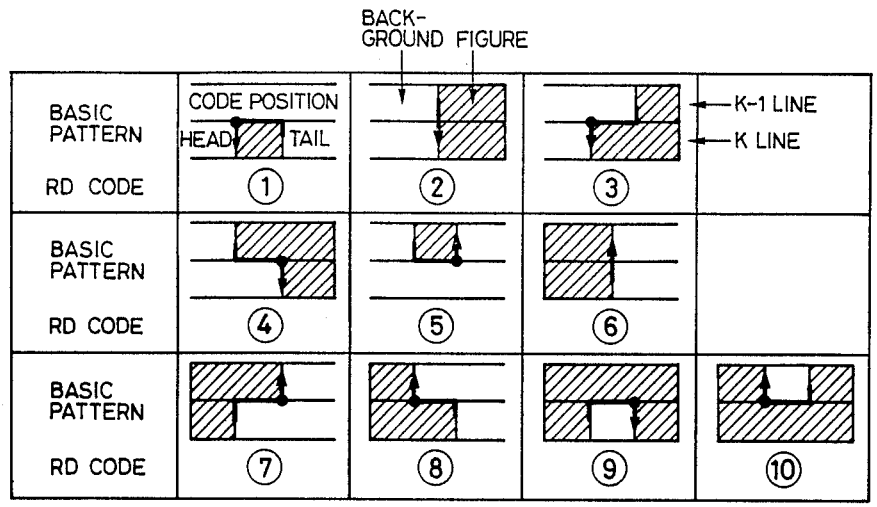
FIG. 2 is a diagram showing various kinds of basic patterns.

FIG. 2 shows ten kinds of basic patterns extracted by the basic pattern extractor 6. The contour lines can all be expressed by the combinations of these basic patterns. Reference numerals 1 to 10 are attached to these basic patterns to call them RD codes (run-type direction codes). An end point of an arrow at the tip of the RD code is called the head and an end point on the other side is called the tail. In FIG. 2, black circles stand for positions of representative points of RD codes that are determined to specify the positions. When the contour lines are to be described by basic patterns called RD codes, the pointer is so operated that the head of the RD code is necessarily linked to the tail of another RD code.

Figure 3:
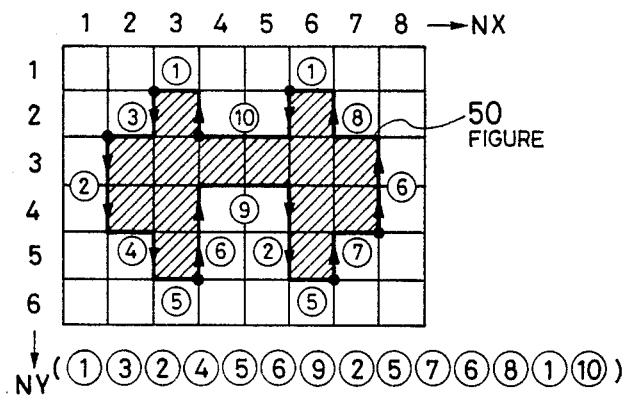
FIG. 3 is a diagram showing an example of the manner of describing a contour of figure using basic patterns of FIG. 2.

FIG. 3 illustrates an example where the contour of a figure in an image having an image size of 8×6 is described using RD codes. The contour of FIG. 50 is expressed as (①)(③)(②) ... (⑩) ) using 14 RD codes. The RD codes can be easily converted into general contour coordinates. If the positions of representative points only of RD codes are used as contour coordinates, then the intermediate coordinates are not included. However, the intermediate coordinates can be interpolated by using the positions of representative points of the preceding succeeding codes. In (①)(③) ... ), for example, if the position of representative point of (①) is (2.5, 1.5) and if the position of representative point of (③) is (1.5, 2.5), then the intermediate coordinate is (2.5, 2.5) and the coordinates are given as ((2.5, 1.5) (2.5, 2.5) (1.5, 2.5) ... ). Here, the positions of representative points have a fraction 0.5 for the reason that the coordinate at the center of the pixel is used as a reference. The fraction may be cut away to simplify the notation, as a matter of course.

Figure 4:
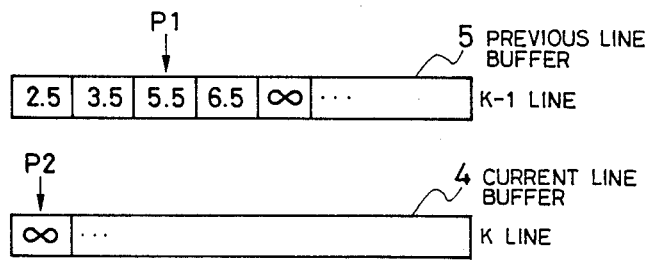
FIG. 4 is a diagram illustrating the data structure of line buffers.

FIG. 4 illustrates the data structure of line buffers according to an embodiment. X coordinates of image transition points are stored in the current line buffer 4 and in the previous line buffer 5, and an end code ∞ is contained at the end of data. A pointer P1 is used for reading the previous line buffer 5 and a pointer P2 is used for reading the current line buffer 4.

FIG. 5 illustrates an automaton for extracting RD codes in the basic pattern extractor 6, wherein $$\begin{bmatrix}B\\B\end{bmatrix}\begin{bmatrix}W\\B\end{bmatrix}\begin{bmatrix}B\\W\end{bmatrix}\begin{bmatrix}W\\W\end{bmatrix}$$

represent a combination of runs between the upper and lower lines under a given status. The upper stage illustrates the kinds of runs in the previous line and the lower stage illustrates the kinds of runs in the current line, symbol B denotes a black run (continuation of 1s, i.e., continuation of black pixels on the image) and symbol W denotes a white run (continuation of 0s, i.e., continuation of white pixels). In FIG. 5, symbol X1 denotes a position of an image transition point read from the previous line buffer 5 and symbol X2 denotes a position of an image transition point read from the current line buffer 4. There are a total of six statuses, and the start of scanning and the end of scanning necessarily pass through the status 1 with each line as a unit. Under each status, there are three kinds of status transitions depending upon the result of comparison of X1 with X2, whereby RD codes (①) to (⑩) are extracted. The image transition points X1, X2 are read from the line buffers 5 and 4 in the order of increasing values of image transition points by comparing them. If the image transition points have the same value, they are read from both line buffers. According to this automaton, the RD code (①) is extracted under the following conditions;

i.e., X1>X2 holds under the status 1, and after X2 is renewed X1>X2 holds under the status 3. If interpreted from the standpoint of the figure, this means that it is confirmed that the upper side of the run (black run in this case) to which attention has now been given is the background. As explained with reference to FIG. 4, the code =is contained in the end of the line buffer and is regarded to be a left edge B from the standpoint of processing. Therefore, after the data is all read out, the status 1 is resumed, i.e., $$\begin{bmatrix}B\\B\end{bmatrix}$$

is resumed.

FIG. 6 shows the processings to be executed relying upon the automaton of FIG. 5 that are grouped depending upon the statuses. The X coordinate of the position of representative point of RD code is renewed, and the RD code is extracted, entered and is renewed to the number of the next status, and the next image transition point is read depending upon the condition of which one of X1 or X2 is greater than the other. When the RD code is being entered, the linking is effected to the RD code that is waiting to be linked. The RD codes can be classified into two kinds:

(1) Those that do not wait to be linked: (⑤) (⑩) —head and tail are both rising (2) Those that wait to be linked: (①)(②)(③)(④)(⑥)  —head or tail is descending As for the RD codes of the group (2), they are controlled by the pointer as the waiting list for linking at the time of being extracted, and the RD code that is now extracted is successively linked to the RD code in the waiting list for linking.

Figure 8:
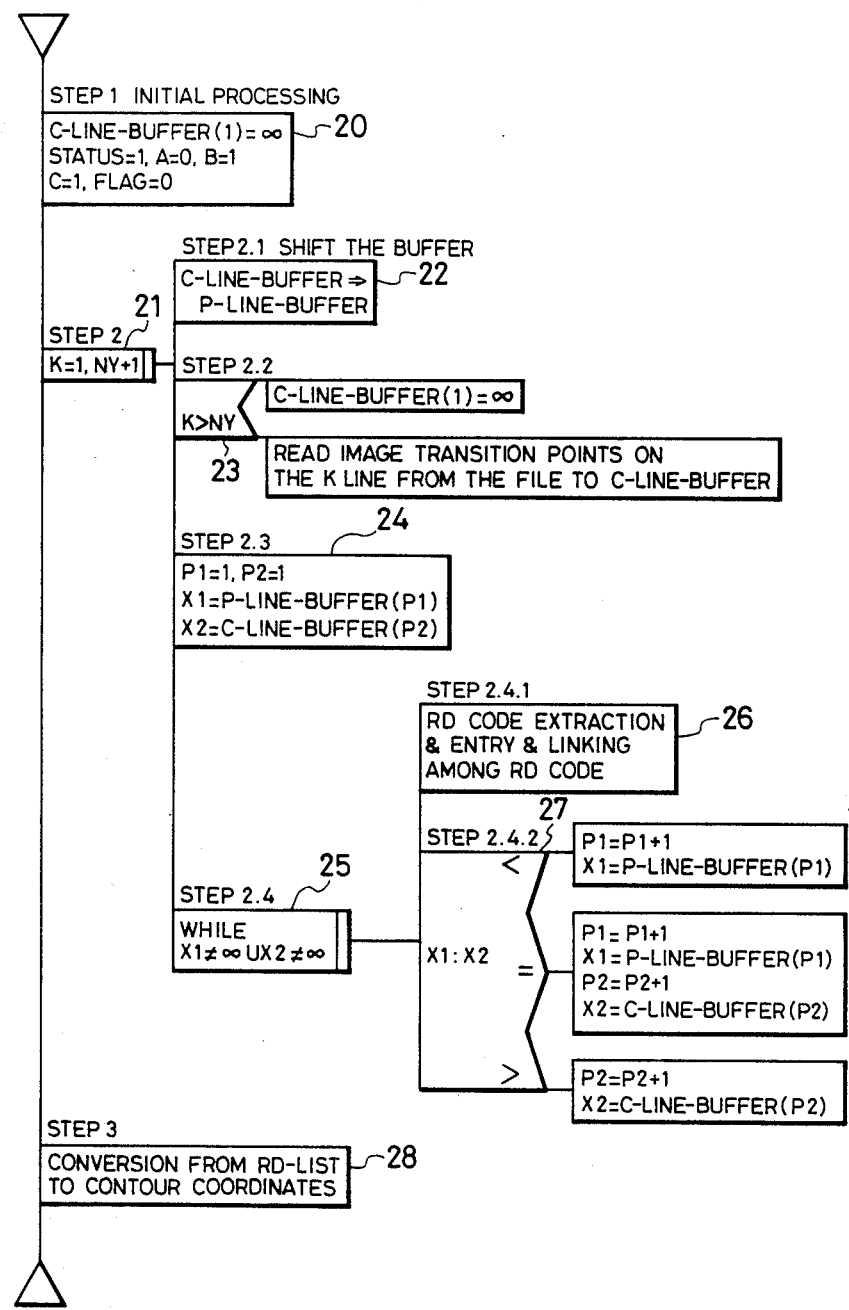
FIG. 8 is a flow chart (PAD) of the whole processing.

FIG. 7 illustrates a basic pattern linking table according to an embodiment. The basic pattern linking table 7 consists of five items, i.e., a representative point position X, Y of the RD code, a code number CODE thereof, a link pointer for linking the RD codes, and a W-link pointer which temporarily lists those RD codes that are waiting for being linked. Further, there are three pointers A, B and C for operating the basic pattern linking table 7. The pointer A is the one that indicates an address for a new RD code entry, the pointer B is the one that indicates the top address of a waiting list for RD code linking, and the pointer C is the one that indicates the last address of the waiting list for RD code linking. Here, FIG. 7 illustrates the case where the image of FIG. 3 is processed. FIG. 8 is a flow chart (PAD) illustrating the procedure for processing the contour tracing using the controller 2 of FIG. 1. In the flow chart of FIG. 8, variables are defined as below:

C-Line-Buffer: current line buffer 4
P-Line-Buffer: previous line buffer 5
Status: status numbers (1 to 6)
A, B, C: pointers
Flag: control flag (0 or 1) of the pointer B
K: line number of the image that is now being scanned.
NY: a maximum line number of the image
RD-List: basic pattern linking table 7

[Flow of Processing for Contour Tracing]

Step 1: Initialization

C-Line-Buffer(1)=∞; set the current line buffer 4 to be "empty".

Status=1; set the initial status of automaton to be 1.
A=0, B=1, C=1, Flag=0; initialize variables.
Step 2: Execute the processing after (NY+1)-th time
Step 2.1: Shift the line buffer.

Here, the buffer shift is a system in which the data is not really transferred but the address of the line buffer is switched depending upon whether K is an odd number or an even number.

The content of the C-Line-Buffer is transferred to the P-Line-Buffer (in practice, the addresses of the C-Line-Buffer and the P-Line-Buffer are switched).

Step 2.2: Image transition points of one line are read out. If K>NY, C-Line-Buffer (1)=∞. If not, read image transition points of one line from the image transition point file 1 and set them to the C-Line-Buffer.

Step 2.3: Initialization for contour tracing between the two lines.

Initialization:

$P_1=1$, $P_2=1$: Initialize the read pointers of line buffers 5 and 4.

X1=P-Line-Buffer(P1); Set the top data of the previous line buffer 5 to the variable X1.

X2=C-Line Buffer(P2); Set the top data of the current line buffer 4 to the variable X2.

Step 2.4: Contour tracing between the two lines.

Execute the following processings until X1 and X2 both acquire the code ∞.
Step 2.4.1: Extraction, entry and linking of RD codes.
Step 2.4.2: Data renewal of X1 and X2.
Note: Steps 2.4.1 and 2.4.2 are based upon the Table of FIG. 6.

Step 3: Convert the RD codes found in the Step 2 into coordinates.

According to the above-mentioned embodiment, the image memory for contour tracing needs be a line buffer for two lines presenting an advantage in economy. Furthermore, the image transition point positions in one direction only are utilized for the contour tracing, enabling the tracing operation to be carried out at a speed faster than the system which utilizes image transition point positions of two directions. Further, ten basic patterns that constitute the contour line can be adapted to any kind of figures making it possible to faithfully describe the contour of the figure. Image files of documents and drawings have usually been converted into run length codes which match well with the contour tracing system of the present invention. Moreover, the embodiment does not employ any special arithmetic unit but employs an ordinary general-purpose computer to guarantee high-speed operation.

According to the present invention as described in the foregoing, the contour tracing can be executed using image transition points of one direction only. Furthermore, since the pointers are attached to the basic patterns extracted by comparing the positions of image transition points between the two lines, no additional search is required for converting the basic patterns into the contour coordinates. Therefore, the contour coordinates are obtained at high speeds.

We claim:

1. A method of tracing a contour to obtain contour coordinates by extracting segments of a contour of a figure from a sampled image, comprising the steps of:

scanning said figure along sequential scanning lines in a single scanning direction;

detecting at least one image transition point for each sequential scanning line through said figure;

extracting segments of the contour of the figure by comparing a detected relationship between the position of an image transition point of each scanning line and the position of an image transition point of the adjacent preceding scanning line to a plurality of basic patterns representing different positional relationship and selecting a basic pattern corresponding to each detected relationship along the contour of the figure;

combining selected basic patterns into a basic pattern sequence on the basis of the positions of the detected image transition points; and converting said basic pattern sequence into a sequence of contour coordinates.

2. A method of tracing a contour according to claim 1, wherein said plurality of basic patterns comprise ten basic patterns which represent the different possible image transition point positional relationships to be found in the contour of any figure.

3. A method of tracing a contour according to claim 2, wherein each of said basic patterns consists of at least one of three vectors of which at least the first and third vectors have a direction crossing the direction of the scanning line.

4. A method of tracing a contour according to claim 3, wherein the direction crossing the direction of said scanning line is almost perpendicular to said scanning line.

5. A method of tracing a contour according to claim 3, wherein said first and third vectors having a fixed unit length and said second vector in the direction of the scanning line has a variable length.

6. A method of tracing a contour according to claim 5, wherein the direction of said second vector is almost horizontal and the direction of said first and third vectors is almost vertical.

7. A system for tracing a contour to obtain contour coordinates by extracting segments of a contour of a figure from a sampled image, comprising:

means for scanning said figure along sequential scanning lines in a single scanning direction;

means for detecting at least one image transition point for each sequential scanning line through said figure;

means for extracting segments of the contour of the figure by comparing a detected relationship between the position of an image transition point of each scanning line and the position of an image transition point of the adjacent preceding scanning line to a plurality of basic patterns representing different positional relationships and for selecting a basic pattern corresponding to each detected relationship along the contour of the figure;

means for combining selected basic patterns into a basic pattern sequence on the basis of the positions of the detected image transition points; and means for converting said basic pattern sequence into a sequence of contour coordinates.

8. A system for tracing a contour according to claim 7, wherein said extracting means is an automaton responsive to signals from said adjacent scanning lines.

* * * * *